United States Patent
Springerley

[11] Patent Number: 6,026,877
[45] Date of Patent: Feb. 22, 2000

[54] PADDLE-TYPE LUG FOR USE WITH CONVERTIONAL TIRE CHAINS

[76] Inventor: Warren A. Springerley, Rte. 1, Box 555, Laveen, Ariz. 85339

[21] Appl. No.: 09/092,189

[22] Filed: Jun. 5, 1998

[51] Int. Cl.$^7$ .................................................. B60C 11/00
[52] U.S. Cl. .......................... 152/223; 301/44.2; 152/228
[58] Field of Search ................................ 301/44.1, 44.2; 152/223, 225 R, 226, 227, 228

[56] References Cited

U.S. PATENT DOCUMENTS

| | | |
|---|---|---|
| 1,344,477 | 6/1920 | Benjestorf . |
| 1,349,083 | 8/1920 | Mook . |
| 1,349,514 | 8/1920 | Lauer . |
| 1,378,083 | 5/1921 | Anderson . |
| 1,444,895 | 2/1923 | Wood ....................................... 152/228 |
| 1,494,689 | 5/1924 | Kennedy .................................. 152/228 |
| 1,499,648 | 7/1924 | Francis ..................................... 152/228 |
| 1,892,945 | 1/1933 | Griebat .................................... 301/44.2 |
| 1,999,536 | 4/1935 | Cunnington ............................. 301/44.2 |
| 2,008,954 | 7/1935 | Griebat .................................... 301/44.2 |
| 2,122,967 | 7/1938 | Theis ........................................ 152/228 |
| 2,259,189 | 10/1941 | Williams et al. ....................... 152/224 |
| 2,271,275 | 1/1942 | Ritscher .................................. 152/228 |
| 2,489,110 | 11/1949 | Small ...................................... 152/228 |
| 3,329,191 | 7/1967 | Nickerson, Jr. ......................... 152/239 |
| 3,794,095 | 2/1974 | Insam ...................................... 152/239 |
| 4,263,954 | 4/1981 | Dwinell .................................. 152/243 |
| 5,022,449 | 6/1991 | Koda ...................................... 152/226 |
| 5,044,415 | 9/1991 | Ishihara .................................. 152/228 |
| 5,645,659 | 7/1997 | Ivan ........................................ 152/216 |

FOREIGN PATENT DOCUMENTS 55389  12/1933  Norway ................................. 152/224

Primary Examiner—S. Joseph Morano
Assistant Examiner—Long Bao Nguyen
Attorney, Agent, or Firm—Warren F. B.Lindsley; Frank J. McGue

[57] ABSTRACT

Lugs for detachably mounting on the chain of a conventional tire mounted wheel of a vehicle. The lug being detachably mounted to a portion of the chain which extends laterally over the tread of the tire mounted wheel of a vehicle. The lugs being means for extracting a vehicle from a snow filled ditch or from ice, mud or sand.

6 Claims, 1 Drawing Sheet

PADDLE-TYPE LUG FOR USE WITH CONVERTIONAL TIRE CHAINS

BACKGROUND OF THE INVENTION

Conventional tire chains have been in use for many years and are particularly effective on highways that are relatively lightly covered with snow. When such roads are traveled, the snow is quickly packed down into an icy surface coating that is unsafe for traffic without the help of chains.

Because the snow covering of the road is often intermittent with stretches of clear pavement interspersed therealong, the conventional snow chains cannot be bulky since they will interfere with road travel over clear pavement stretches causing unacceptable vibration and noise.

Unfortunately, situations are sometimes encountered in which such relatively lightweight snow chains are not as effective as they need to be. The automobile may become hung up in a snow drift or it might inadvertently be driven off the snow covered roadway obscured by heavy snow. In such cases, as the tires spin, the lightweight chains tend to clog with ice and frozen snow and the vehicle cannot be extricated from the snow drift. For such situations, a chain with heavy paddle-type lugs is needed if the automobile is to return under its own power to the roadway.

The present invention provides robust paddle-type lugs which may be readily secured to the chains at the scene of the difficulty, and with the lugs attached the necessary improvement in traction is realized. Once the vehicle has returned to a relatively lightly covered roadway, the lugs may be easily removed.

DESCRIPTION OF THE PRIOR ART

Various types of snow chains and related devices are described in the prior art.

U. S. Pat. Nos.1,349,083, 1,349,514 and U.S. Pat. No. 1,378,083 describe traction devices that may be attached to the relatively open wheels of early automobiles such as those in use around 1920.

U. S. Pat. Nos.1,344,477, 3,794,095, 4,263,954 and U.S. Pat. No. 4,303,116 describe various versions of snow chains suitable for use on roadways that are lightly covered with snow.

Norwegian patent 55389 and U. S. Pat. Nos. 2,259,189 and 3,329,191 describe various devices which may be attached on the road to conventional snow chains for improved traction or as anti-skid devices. None of these devices provide the radical improvement in traction that is required under the off-roadway conditions described above. Furthermore. except for the anti-skid device described in U. S. Pat. No. 2,259,189, these devices are not easily attached and removed from the wheels of the vehicle.

SUMMARY OF THE INVENTION

In accordance with the invention claimed, a novel paddle-type lug is provided for attachment to a wheel mounted conventional tire chain for use under conditions for which the conventional tire chain does not afford sufficient traction.

It is, therefore, one object of this invention to provide a paddle-type lug for attachment to conventional tire chains.

Another object of this invention is to provide such a paddle-type lug in a form that may be easily and quickly installed on the tire of a vehicle on which a conventional tire chain has been mounted.

A further object of this invention is to provide such a paddle-type lug in a form which may be quickly and easily removed after use.

A still further object of this invention is to provide a new and improved lug in a form that may be attached to the tire chain by simply sliding a leading edge of the base of the lug under a length of the chain that passes laterally over the tread of the tire whereupon the length of the chain falls into a retaining groove that is formed into the base of the lug.

A still further object of this invention is to provide a lug arranged to extend radially outwardly of the tread of a wheel mounted tire which is held to the wheel by a portion of the wheel mounted chain.

A still further object of this invention is to provide a lug for attaching to a wheel mounted chain that extends radially outward of the treads of a vehicle wheel when the wheel is revolved by the vehicle.

Further objects and advantages of this invention will become apparent as the following description proceeds and the features of novelty which characterize the invention will be pointed out with particularity in the claims annexed to and forming a part of this specification.

Brief Description of the Drawing

The present invention may be more readily described with reference to the accompanying drawing in which.

DESCRIPTION OF THE PREFERRED EMBODIMENT

Figure 1:
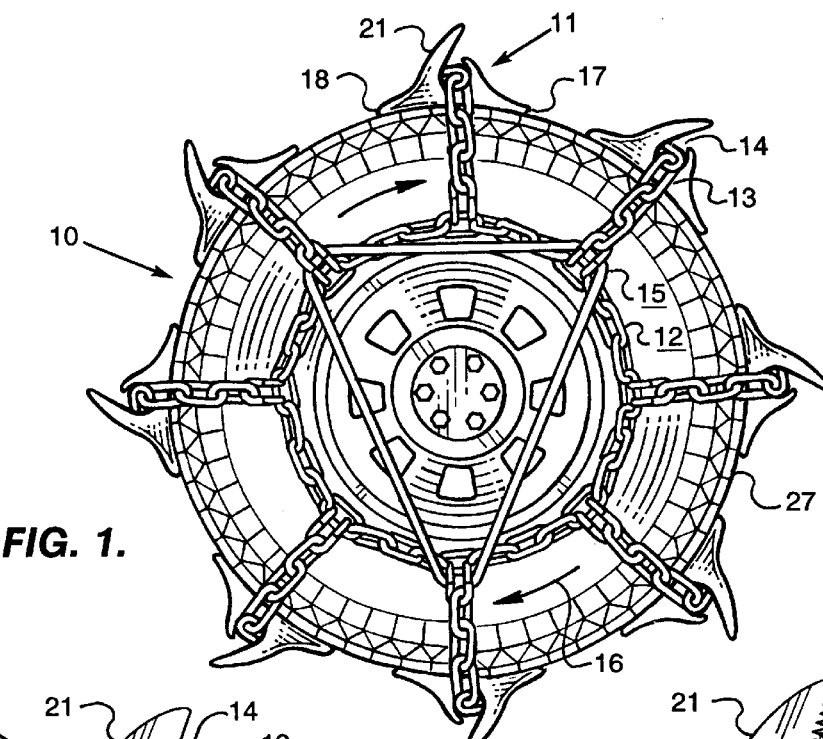
FIG. 1 is a side view of the wheel of an automobile on which a number of paddle-type lugs are held in place about the circumference of the tire by a conventional tire chain.

Referring more particularly to the drawing by characters of reference, FIG. 1 discloses a wheel 10 of an automobile or other vehicle on which a number of paddle-type lugs 11 of the invention have been mounted. As shown, lugs 11 are held in place by a conventional tire or snow chain 12 with segments 13 of chain 12 passing laterally over the tread area of the tire and through transverse retainer grooves 14 that are formed in the lugs. An elastic bungee type lood or tensioning cord 15 takes up the slack in the chain.

Figure 2:
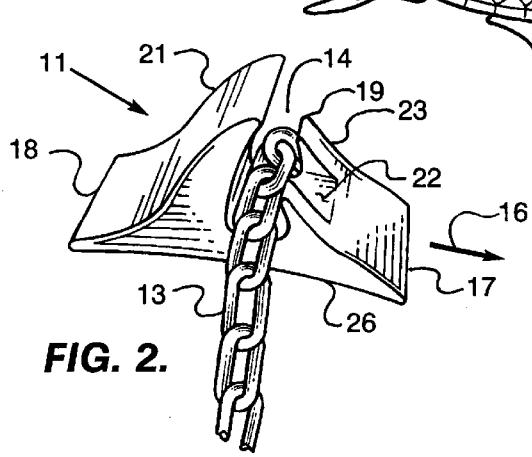
FIG. 2 is an enlarged perspective view of one of the paddle-type lugs of the invention, showing a segment of a tire chain passing through a retainer groove of the lug.
Figure 3:
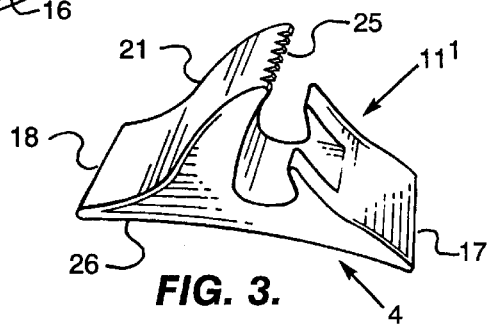
FIG. 3 is a perspective view of a variation of the paddle-type lug shown in FIGS. 1 and 2.

As shown in FIGS. 1, 2 and 3, with wheel 10 turning in the direction indicated by arrows 16, each lug is provided with a leading edge 17 and a trailing edge 18. From the thin leading edge 17 the contour of lug 11 slopes upwardly to forward edge 19 of retainer groove 14. At the rearward edge of groove 14, a traction paddle 21 is arranged to extend radially outwardly with a slightly forward cant. The rearward face of paddle 21 sweeps downwardly to trailing edge 18. Leg 11 may be molded or fabricated from aluminum, plastic or any other suitable material.

As shown in FIG. 2, retainer groove 14 is preferably open in the center leaving a central channel 22 through which the full depth of paddle 21 confronts the snow, sand and ice masses, realizing thereby an improved degree of traction. If the upwardly (or outwardly) sloping forward surface were to extend across the full width of lug 11 there would be a greater tendency for lug 11 to ride over the top of the ice pack whereas a narrow ramp 23 at each side more readily penetrates the ice and snow.

FIG. 3 illustrates a variation of lug 11 wherein an outer edge 25 of paddle 21 of lug 11' is serrated. The serrated edge provides improved traction particularly when a layer of ice under the snow cover is encountered. The serrated edge more readily "bites" into the icy underlayer than a plane edge.

Figure 4:
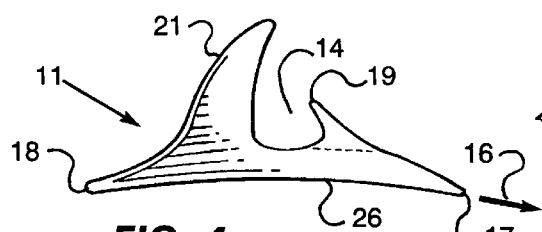
FIG. 4 is a side view of the paddle-type lug shown in FIGS. 1 and 2.

As shown in FIGS. 2, 3 and 4, the mounting surface 26 of lugs 11 and 11' which rests against tread 27 the tire is curved to approximate the curvature of the tire. This curvature and the relatively long dimension of the base of the lug (from leading edge 17 to trailing edge 18) enhance the stability of the lug under the severe stresses encountered by the lug as it strikes the ice, snow, sand and road surfaces.

Figure 5:
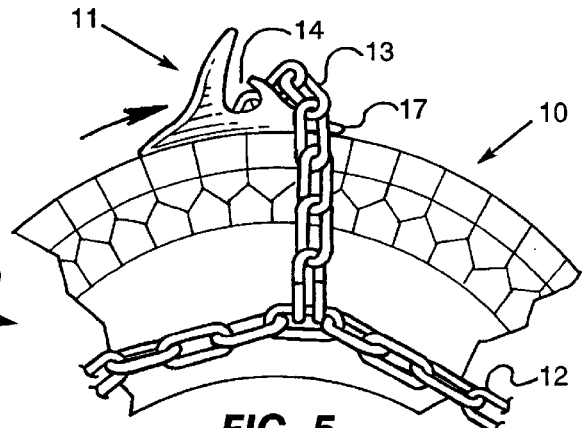
FIG. 5 illustrates an installation of the paddle-type lug positioned under a segment of the conventional tire chain.

The ease with which lugs 11 are secured to the wheel and the previously installed ice chain 12 is illustrated in FIG. 5. The chain 12 is first loosened by hooking the chain ends into different links (not shown in the drawing) in a manner well known in the art. The leading edge 17 of the lug is then inserted under the cross-chain 13 and moved forwardly until the cross-chain 13 falls into groove 14. When all of the lugs have been installed in this manner, the chain ends are connected together and the tensioning cord 15 is installed to take up the remaining slack.

In operation, the lugs may tend to rock rearwardly under stress, but as they do, the slack is taken up by the outward movement of the lug.

It should be noted that the same set of lugs will be useful for providing traction in the forward or reverse directions.

In accordance with the stated objects of the invention, a new and improved paddle-type lug is thus shown to be provided in a form that is readily attachable to conventional tire chains for use in emergency situations, and which is just as easily removed again. The dimensions and geometry of the lug provide a high degree of traction for use with a heavy cover of ice and snow.

Figure 6:
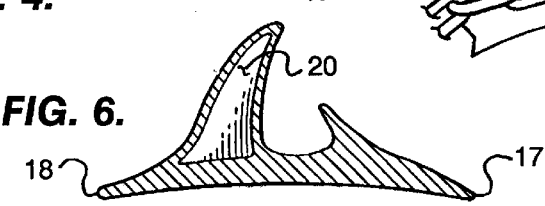
FIG. 6 is a cross sectional view of a modification of the lug shown in FIG. 4.

FIG. 6 illustrates a light weight, hollow traction paddle 20 which may be made of steel or other heavy metals. The use of heavy metals provide longer life for use on rough terrain or heavier vehicles or equipment.

Although but a few embodiments of the invention have been illustrated and described, it will be apparent to those skilled in the art that various changes and modifications may be made therein without departing from the spirit of the invention or from the scope of the appended claims.

What is claimed is:

1. A lug for attaching to a wheel mounted chain for traction purposes wherein the chain has at least one portion thereof extending laterally across the tread of a tire;

said lug comprising an elongated base and a traction paddle;

said elongated base having a leading edge and a trailing edge and a groove extending laterally across said elongated base between said trailing edge and said leading edge for receiving therein said one portion of said chain;

said groove opening radially outwardly of said elongated base; and said traction paddle heing mounted upon said trailing edge of said elongated base and extending radially outwardly higher than said leading edge of said elongated base, said traction paddle having a forward cant for penetrating snow, ice, mud and/or sand upon rotation of said wheel when said lug is placed on the tread of said tire and said one portion of said chain is positioned within said groove of said elongated base.

2. The lug set forth in claim 1 wherein said leading edge slopes upwardly to a forward edge of said groove, said leading edge having a central channel opening into said groove.

3. The lug set forth in claim 1 wherein:

the forward cant of said traction paddle is serrated for increasing the penetration of the snow, ice, mud and/or sand when mounted in said lug.

4. The lug set forth in claim 1 wherein:

said groove extends within said lug between said trailing and leading edge parallel to said trailing and leading edge of said lug.

5. The lug set forth in claim 1 wherein:

said elongated base is rectangular and is provided with one surface which conforms to the arcuate configuration of the outer surface of said tread of the tire when placed thereon.

6. The lug set forth in claim 1 wherein:

said lug is detachably mounted on the tread of said tire.

* * * * *